(12) United States Patent
Aster

(10) Patent No.: US 10,972,421 B2
(45) Date of Patent: Apr. 6, 2021

(54) METHOD FOR DETECTING AND REPRODUCING RADIOTELEPHONY MESSAGES EMITTED BY A PLURALITY OF TRANSMITTERS VIA RADIO AND DEVICE THEREFOR

(71) Applicant: FREQUENTIS AG, Vienna (AT)

(72) Inventor: Robert Aster, Vienna (AT)

(73) Assignee: Frequentis AG, Vienna (AT)

( * ) Notice: Subject to any disclaimer, the term of this patent is extended or adjusted under 35 U.S.C. 154(b) by 0 days.

(21) Appl. No.: 16/812,602

(22) Filed: Mar. 9, 2020

(65) Prior Publication Data
US 2020/0287859 A1 Sep. 10, 2020

(30) Foreign Application Priority Data
Mar. 8, 2019 (AT) ............... A 50193/2019

(51) Int. Cl.
*H04W 4/10* (2009.01)
*H04W 76/45* (2018.01)
*H04L 12/58* (2006.01)
*G08G 5/00* (2006.01)

(52) U.S. Cl.
CPC ........... *H04L 51/26* (2013.01); *G08G 5/0013* (2013.01); *G08G 5/0043* (2013.01); *H04W 4/10* (2013.01); *H04W 76/45* (2018.02)

(58) Field of Classification Search
CPC ........ H04L 51/26; H04W 76/45; H04W 4/10; H04W 76/00; G08G 5/0013; G08G 5/0043; G08G 5/0026; G08G 5/0082; G06F 3/165
See application file for complete search history.

(56) References Cited

U.S. PATENT DOCUMENTS

| | | | |
|---|---|---|---|
| 5,867,804 A * | 2/1999 | Pilley ................... | G08G 5/0082 701/120 |
| 6,195,609 B1 * | 2/2001 | Pilley ..................... | G01S 19/15 701/120 |
| 7,606,536 B1 | 10/2009 | Koenck et al. | |
| 8,280,741 B2 * | 10/2012 | Colin ................... | G08G 5/0013 704/275 |
| 10,001,966 B1 | 6/2018 | McGauchy et al. | |
| 10,263,721 B2 | 4/2019 | Phillips et al. | |
| 2007/0189328 A1 * | 8/2007 | Judd ...................... | G10L 15/26 370/466 |

(Continued)

FOREIGN PATENT DOCUMENTS

| | | |
|---|---|---|
| EP | 1460870 A2 | 9/2004 |
| WO | 2015145138 A2 | 10/2015 |

*Primary Examiner* — Julio R Perez
(74) *Attorney, Agent, or Firm* — Laurence A. Greenberg; Werner H. Stemer; Ralph E. Locher

(57) ABSTRACT

A method and a device detect and reproduce radiotelephony messages emitted by a plurality of transmitters via radio at an air traffic controller workplace. It is analyzed whether a plurality of radiotelephony messages arriving at the air traffic controller workplace overlap one another chronologically, and if they do, one of the radiotelephony messages is prioritized and immediately emitted at the air traffic controller workplace. At least one other radiotelephony message is buffered, and the at least one buffered radiotelephony message is emitted at the air traffic controller workplace after the end of the prioritized radiotelephony message.

12 Claims, 3 Drawing Sheets

(56) References Cited

U.S. PATENT DOCUMENTS

2008/0254750 A1   10/2008  Whitaker Filho
2012/0215435 A1*   8/2012  Subbu .................. G08G 5/0013
   701/120
2014/0257598 A1*   9/2014  Bailey ...................... G06F 7/00
   701/3

* cited by examiner

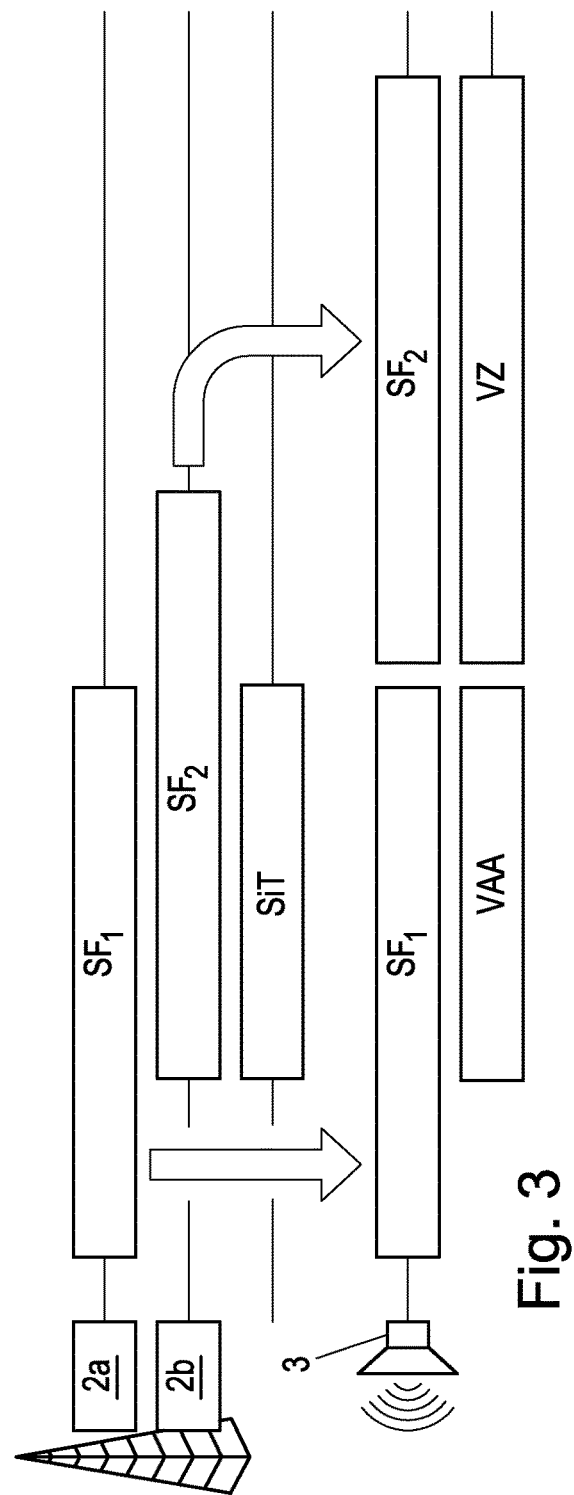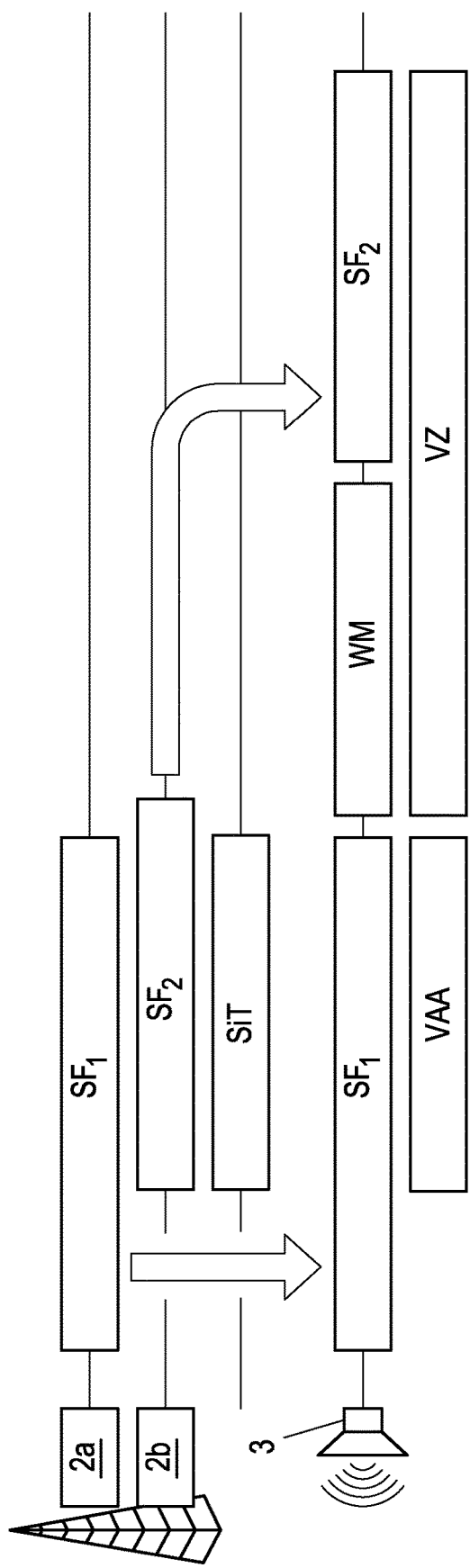

METHOD FOR DETECTING AND REPRODUCING RADIOTELEPHONY MESSAGES EMITTED BY A PLURALITY OF TRANSMITTERS VIA RADIO AND DEVICE THEREFOR

CROSS-REFERENCE TO RELATED APPLICATION

This application claims the priority, under 35 U.S.C. § 119, of Austrian Patent Application A50193/2019, filed Mar. 8, 2019; the prior application is herewith incorporated by reference in its entirety.

BACKGROUND OF THE INVENTION

Field of the Invention

The present invention relates to a method for detecting and reproducing radiotelephony messages emitted by a plurality of transmitters via radio at an air traffic controller workplace according to the independent method patent claim, and a speech transmission system according to the independent system patent claim.

Particularly in the field of air traffic control, situations may occur in which, for example, two aircraft, or one aircraft and a controller or air traffic controller, speak or transmit simultaneously via radio. This is referred to as simultaneous radio transmission (SiT), i.e., reception of multiple messages overlapping chronologically via a plurality of transceiver stations which may be associated with the same radio channel or with different radio channels. From the prior art, it is known that the air traffic controller receives a visual or acoustic indication if such a simultaneous radio transmission is detected, i.e., if at least two aircraft or at least one aircraft and the air traffic controller speak simultaneously. In this case, the chronologically later radiotelephony message of the affected transceiver station is mixed into the original speech.

The disadvantage of such a known approach is that although the air traffic controller can detect that there are two different conversations which overlap one another chronologically, it is difficult or impossible for the air traffic controller to understand them or to distinguish them acoustically.

SUMMARY OF THE INVENTION

The object of the present invention is therefore to provide a method and a device which make it possible for an air traffic controller to distinguish a plurality of radiotelephony messages overlapping one another chronologically and to understand each of them completely.

The present invention achieves this object with a method for detecting and reproducing radiotelephony messages emitted by a plurality of transmitters via radio at an air traffic controller workplace, having the characterizing features of the independent method patent claim. According to the present invention, it is thus provided that it is analyzed whether a plurality of radiotelephony messages arriving at the air traffic controller workplace overlap chronologically, and in this case:
a) one of the radiotelephony messages is prioritized and immediately emitted at the air traffic controller workplace,
b) the at least one other radiotelephony message is buffered, and
c) the at least one buffered radiotelephony message is emitted at the air traffic controller workplace after the end of the prioritized radiotelephony message.

By means of such an approach, it is advantageously ensured that as soon as a simultaneous radio transmission, i.e., a chronological overlap of a plurality of radiotelephony messages arriving at the air traffic controller workplace, is detected, one of the arriving radiotelephony messages is prioritized, and the respective at least one other one is not put through to the air traffic controller, but is buffered. As soon as the prioritized radiotelephony message has been emitted, the buffered radiotelephony message is emitted at the air traffic controller workplace. In this way, it is possible for the air traffic controller to distinguish a plurality of conversations overlapping one another chronologically and to understand each of them separately from one another, since the controller hears the radiotelephony messages chronologically offset.

It is possible to provide a particularly simple approach for prioritization if the radiotelephony message starting chronologically earlier is prioritized and the at least one radiotelephony message respectively starting later is buffered.

In order to avoid further radiotelephony messages arriving simultaneously during the period of time in which the buffered radiotelephony message is emitted, it may be provided that during the period of time after the end of the prioritized radiotelephony messages and/or all radiotelephony messages arriving overlapped, an in particular automatically generated speech message is transmitted to all transmitters which continues at least until the at least one buffered radiotelephony message has been emitted at the air traffic controller workplace.

As a result, it may advantageously be ensured that the aircraft or transmitters are informed that the air traffic controller is currently hearing another radiotelephony message, or another radiotelephony message is being emitted at the air traffic controller workplace.

In order to facilitate the understanding of the current situation for the air traffic controller or to indicate that a simultaneous radio transmission was detected, it may be provided that a warning message is emitted at the air traffic controller workplace before the playback of the at least one buffered radiotelephony message, which indicates the chronologically overlapped arrival of the radiotelephony messages.

In this way, it may be ensured that the air traffic controller is informed that the buffered radiotelephony message has arrived in a chronologically overlapping manner with the prioritized radiotelephony message which was just emitted.

In order to ensure that the air traffic controller can interrupt the emission of a prioritized or buffered radiotelephony message at any time or can personally emit radiotelephony messages, it may be provided that the playback of the at least one buffered radiotelephony message and/or the voice message are interrupted if a push-to-talk button is actuated at the air traffic controller workplace.

Thus, the air traffic controller can advantageously actively emit radiotelephony messages in order to be able to react to the respective situation or to take actions subsequent to or during emitted radiotelephony messages.

In order to improve the quality of a plurality of radiotelephony messages which arrive at the air traffic controller workplace and which overlap one another chronologically, it may be provided that if radiotelephony messages which arrive at the individual transceiver stations and which are different from one another, overlap one another chronologically, a) for each individual arriving radiotelephony message, in each case, the transceiver station is ascertained at which the arriving radiotelephony message is not overlapped or is received having the best quality, and b) in each case, the radiotelephony message received not overlapped via the transceiver station ascertained in such a way is conveyed to the air traffic controller workplace and/or is buffered in a buffer.

Thus, it may be advantageously ensured that for each individual arriving radiotelephony message, the transceiver station is selected at which either only this radiotelephony message arrives, i.e., the radiotelephony message is not overlapped with other radiotelephony messages, or the radiotelephony message is received having the best quality in comparison with the other transceiver stations, and only the radiotelephony message respectively arriving at this identified transceiver station is brought to the attention of, or buffered for, the air traffic controller.

The present invention furthermore relates to a voice transmission system as claimed in the independent system patent claim. According to the present invention, in this case, the voice transmission system contains:

a) a number of transceiver stations which are connected to a common air traffic controller workplace, wherein the air traffic controller workplace has at least one loudspeaker for emitting radiotelephony messages, and b) a control and processing unit which is connected between the transceiver stations and the air traffic controller workplace, containing a buffer for storing radiotelephony messages, wherein the control and processing unit is configured:

b1) to detect whether radiotelephony messages which arrive via the individual transceiver stations and which are different from one another overlap one another chronologically, and if a chronological overlap of a plurality of radiotelephony messages is detected, b2) to prioritize one of the transceiver stations and to convey the respective radiotelephony message immediately to the air traffic controller workplace and to emit it via the loudspeaker, b3) to buffer the at least one radiotelephony message not conveyed to the air traffic controller workplace in the buffer, and b4) to emit the at least one buffered radiotelephony message via the loudspeaker at the air traffic controller workplace after the end of the prioritized radiotelephony message.

Via a voice transmission system configured in such a way, it is advantageously possible that radiotelephony messages which chronologically overlap with one another are emitted at the air traffic controller workplace in succession, i.e., chronologically offset, so that the air traffic controller can distinguish chronologically overlapping radiotelephony messages and can completely understand each of them.

A particularly simple way of prioritizing a radiotelephony message may be achieved with a voice transmission system according to the present invention if the control and processing unit is configured, from among the chronologically overlapping radiotelephony messages, and:

a) to prioritize the radiotelephony message starting chronologically earlier, and b) to buffer the at least one radiotelephony message starting chronologically later in the buffer.

In order to avoid further radiotelephony messages being emitted while a buffered radiotelephony message is being played back at the air traffic controller workplace, it may be provided that the control and processing unit is configured to transmit an in particular automatically generated voice message to the transmitting systems via the transceiver stations, during the period of time after the end of the prioritized radiotelephony messages and/or all radiotelephony messages arriving overlapped. The voice message continues at least until the at least one buffered radiotelephony message has been emitted.

In order to indicate to the air traffic controller that a plurality of radiotelephony messages have arrived which have overlapped one another chronologically, it may be provided that the control and processing unit is configured to emit a warning message via the loudspeaker at the air traffic controller workplace before the emission of the at least one buffered radiotelephony message, which indicates the chronologically overlapped arrival of the radiotelephony messages.

In order to be able to ensure that the air traffic controller can actively interrupt the playback of radiotelephony messages in the case of a voice transmission system according to the present invention, in order, for example, to emit a radiotelephony message personally, it may be provided that a push-to-talk button is provided at the air traffic controller workplace which is connected to the control and processing unit. The control and processing unit is configured to interrupt the emission of the buffered radiotelephony message and/or the voice message if the push-to-talk button is actuated.

In order to ensure a separate playback of individual arriving radiotelephony messages without interfering overlapping, when a plurality of radiotelephony messages have arrived at the air traffic controller workplace chronologically overlapping, if radiotelephony messages which arrive at the individual transceiver stations and which are different from one another overlap one another chronologically, it may be provided that the control and processing unit is designed:

a) for each arriving radiotelephony message, in each case, to ascertain the transceiver station at which the arriving radiotelephony message is received not overlapped, and b) in each case, to convey and/or to buffer in the buffer the radiotelephony message which is received not overlapped or having the best quality via the transceiver station ascertained in such a way, to the air traffic controller workplace.

Other features which are considered as characteristic for the invention are set forth in the appended claims.

Although the invention is illustrated and described herein as embodied in a method for detecting and reproducing radiotelephony messages emitted by a plurality of transmitters via radio and device therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

FIG. 3 is a flow chart depicting a first exemplary embodiment of a method according to the invention;

FIG. 4 is a flow chart depicting a second exemplary embodiment of a method according to the invention;

DETAILED DESCRIPTION OF THE INVENTION

Figure 1:
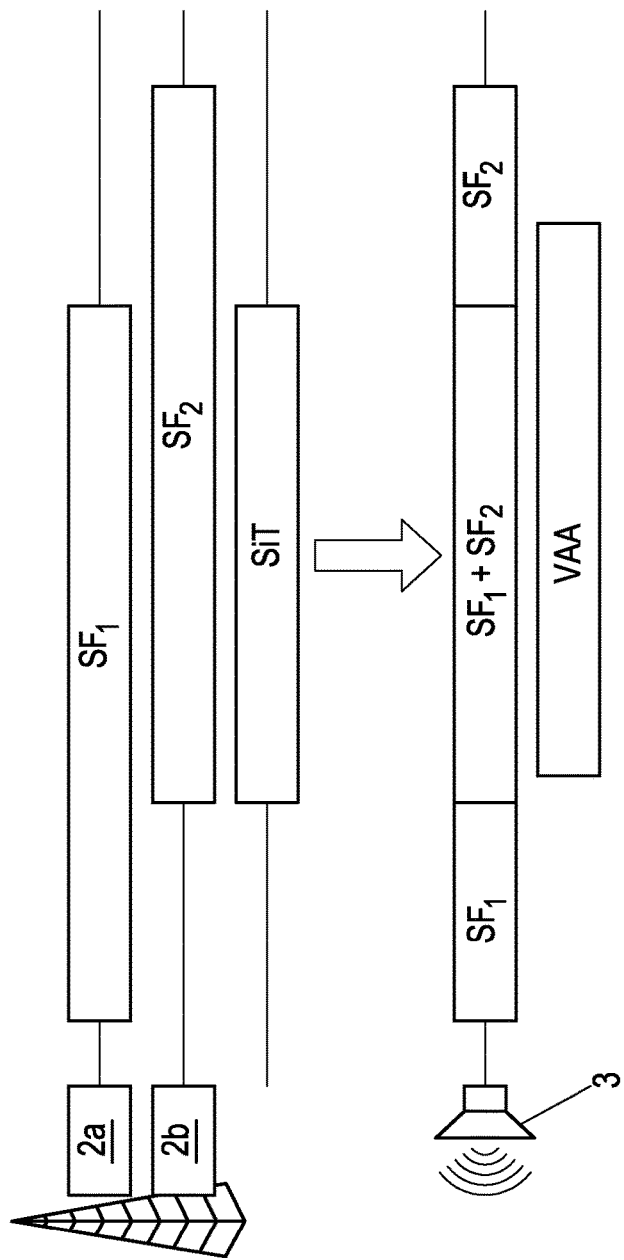
FIG. 1 is a flow chart depicting an approach known from the prior art.

Referring now to the figures of the drawings in detail and first, particularly to FIG. 1 thereof, there is shown a flow chart depicting a method known from the prior art, for the case that a plurality of radiotelephony messages, overlapping one another chronologically, arrive at an air traffic controller workplace.

As is apparent in FIG. 1, two radiotelephony messages $SF_1$, $SF_2$ which partially overlap one another chronologically arrive at the air traffic controller workplace or two transceiver stations $2a$, $2b$ connected to the air traffic controller workplace. The transmission of the radiotelephony message $SF_1$ emitted by a first aircraft $P_1$ begins in the depicted exemplary embodiment before the radiotelephony message $SF_2$ transmitted by a second aircraft $P_2$. In this case, the radiotelephony message $SF_1$ of the first aircraft $P_1$ arrives at the transceiver unit $2a$, and the radiotelephony message $SF_2$ of the second aircraft $P_2$ arrives at the transceiver station $2b$.

This means that although the first aircraft $P_1$ has begun to transmit earlier than the second, in a certain period of time after the start of the transmission of the first radiotelephony message $SF_1$, an overlap or summation of the radiotelephony messages $SF_1$, $SF_2$ which arrive at the two transceiver stations $2a$, $2b$, for example, is emitted by a loudspeaker 3 at the air traffic controller workplace. The air traffic controller at the air traffic controller workplace hears the radiotelephony message $SF_2$ of the second aircraft $P_2$ remaining as of this point of time without further overlap only when the first aircraft $P_1$ has ended the transmission of its radiotelephony message $SF_1$ to the transceiver station $2a$.

As is apparent in FIG. 1, in the method known from the prior art, such a simultaneous radio transmission, i.e., an arrival of chronologically overlapping radiotelephony messages, is detected and is visually and/or acoustically displayed via an indication VAA to the air traffic controller at the air traffic controller workplace; however, the radiotelephony message $SF_2$ starting later is mixed in with the radiotelephony message $SF_1$ which started earlier and is already being emitted at the air traffic controller workplace.

This results in the air traffic controller being able to detect that there are two different chronologically overlapping radiotelephony messages $SF_1$, $SF_2$. However, the summation of the two overlapping radiotelephony messages $SF_1$, $SF_2$ makes it difficult to distinguish the two conversations and to understand either one of them. In addition, an interfering echo may occur during the emission of the radiotelephony messages $SF_1$, $SF_2$ via the loudspeaker 3.

Figure 2:
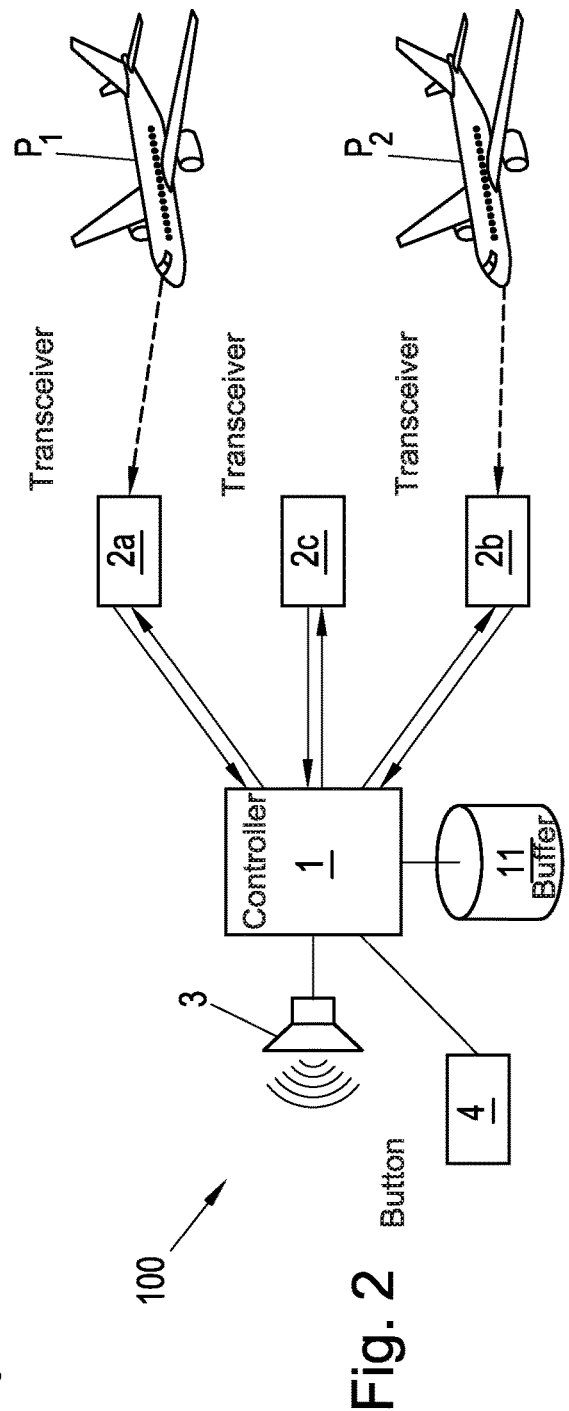
FIG. 2 is a block diagram depicting an exemplary embodiment of a voice transmission system according to the invention.

The method according to the present invention and the voice transmission system 100 according to the present invention provide a remedy in this regard. FIG. 2 shows a schematic representation of such a voice transmission system 100. As depicted in FIG. 2, the system contains a plurality of transceiver stations $2a$, $2b$, $2c$ which are connected to a common air traffic controller workplace. In this case, the air traffic controller workplace contains at least one loudspeaker 3 and a push-to-talk button 4, wherein radiotelephony messages $SF_1$, $SF_2$, SF which arrive at the air traffic controller workplace via the transceiver stations $2a$, $2b$, $2c$ can be emitted via the loudspeaker 3.

Furthermore, the voice transmission system 100 depicted in FIG. 2 contains a control and processing unit 1 which is connected between the transceiver stations $2a$, $2b$, $2c$ and the air traffic controller workplace. In this case, the control and processing unit 1 contains a buffer 11 for storing radiotelephony messages SF, $SF_2$. The control and processing unit 1 is further configured to determine whether radiotelephony messages SF, $SF_1$, $SF_2$ which are different from one another and which arrive via the individual transceiver stations $2a$, $2b$, $2c$ overlap one another chronologically. In addition, the chronological sequence of the PTT-type, SQU, PTT-id, PM, PTTS and SCT signaling information arriving from the individual transceiver stations $2a$, $2b$, $2c$ is analyzed, and on the basis thereof, the decision is made whether it concerns a pilot transmission or a plurality of radiotelephony messages which overlap one another chronologically. Further information about the aforementioned signaling information may be found, for example, in the EUROCAE ED-137/1C standard.

This means that when, as in the depicted example, a plurality of radiotelephony messages SF, $SF_1$, $SF_2$ are emitted, for example, from two aircraft $P_1$, $P_2$, and these radiotelephony messages SF, $SF_1$, $SF_2$ arrive at the transceiver stations $2a$, $2b$, $2c$, the control and processing unit 1 analyzes whether these radiotelephony messages SF, $SF_1$, $SF_2$ overlap chronologically.

If such a chronological overlap of a plurality of radiotelephony messages SF, $SF_1$, $SF_2$ is determined by the control and processing unit 1, so the control and processing unit 1 prioritizes one of the transceiver stations $2a$, $2b$, $2c$ according to predetermined criteria. This prioritization may take place according to the "first come-first serve" principle of the transceiver station of the radiotelephony message. The radiotelephony message $SF_1$ received at the prioritized transceiver station $2a$, $2b$, $2c$ is immediately conveyed to the traffic controller workplace and emitted via the loudspeaker 3.

The respective at least one radiotelephony message SF, $SF_1$, $SF_2$ which is not conveyed to the air traffic controller workplace is buffered by the control and processing unit 1 in the buffer 11. If the emission of the prioritized radiotelephony message $SF_1$ has ended, or if no more external radio messages are emitted, which, for example, is apparent in that there is no longer a squelch signal at the air traffic controller workplace, the at least one buffered radiotelephony message $SF_2$ is emitted by the control and processing unit 1 via the loudspeaker 3 at the air traffic controller workplace.

Although only two chronologically overlapping radiotelephony messages $SF_1$, $SF_2$ are depicted in each case in the depicted exemplary embodiments for the sake of simplicity, the method according to the present invention or a voice transmission system 100 according to the present invention is also applicable in the case of the arrival of a plurality of chronologically overlapping radiotelephony messages SF.

This approach advantageously makes it possible that, as soon as the voice transmission system 100 or the control and processing unit 1 of the voice transmission system 100 detects the reception of a plurality of chronologically overlapping messages via different transceiver stations $2a$, $2b$, $2c$, i.e., a simultaneous radio transmission (SiT), the radio signal of the affected transceiver station is not immediately switched over to the air traffic controller, but rather, a portion of the radio signal or a radiotelephony message SF is prioritized, and additional radiotelephony messages SF chronologically overlapping this prioritized radiotelephony message are buffered and are not immediately emitted at the air traffic controller workplace.

This thus makes it possible for the air traffic controller to hear individual radiotelephony messages SF chronologically offset, so that the controller can fully understand them, whereby in addition, an interfering echo is avoided.

FIG. 3 shows a first exemplary embodiment of a method according to the present invention which may be carried out with the aid of a previously described voice transmission system 100. As is apparent in FIG. 3, two radiotelephony messages $SF_1$, $SF_2$ arrive at the two transceiver stations $2a$, $2b$ connected to the air traffic controller workplace, wherein the radiotelephony message $SF_1$ begins chronologically earlier than the radiotelephony message $SF_2$. However, the radiotelephony message $SF_2$ continues after the end of the radiotelephony message $SF_1$.

This means that an overlap of the two radiotelephony messages $SF_1$, $SF_2$ occurs in a period of time after the start of the transmission of the radiotelephony message $SF_1$, until the first radiotelephony message $SF_1$ is completely emitted. In other words, a plurality of chronologically overlapping messages are received via the same radio channel, which is indicated in the depicted exemplary embodiment by the reference character SiT.

In the depicted exemplary embodiment, the control and processing unit 1 of the voice transmission system 100 is configured, from among the chronologically overlapping radiotelephony messages $SF_1$, $SF_2$, to prioritize the radiotelephony message starting chronologically earlier. In this case, in the depicted exemplary embodiment, it is the radiotelephony message $SF_1$.

In the depicted exemplary embodiment, the first radiotelephony message $SF_1$ is prioritized, and the second radiotelephony message $SF_2$, i.e., the radiotelephony message starting chronologically later, is buffered in the buffer 11. If the prioritized radiotelephony message $SF_1$ is completely emitted without further time delay at the air traffic controller workplace, the buffered radiotelephony message $SF_2$ is subsequently played back at the air traffic controller workplace.

As is apparent in FIG. 3, as soon as a simultaneous radio transmission SIT is detected by the control and processing unit 1, in addition, a visual and/or acoustic indication VAA that chronologically overlapping radiotelephony messages $SF_1$, $SF_2$ are arriving at the transceiver stations $2a$, $2b$, is emitted at the air traffic controller workplace during the prioritized radiotelephony message $SF_1$. While the buffered radiotelephony message $SF_2$ is subsequently emitted to the prioritized radiotelephony message $SF_1$, in the depicted exemplary embodiment, a visual indication VZ takes place at the air traffic controller workplace, which indicates that a buffered radiotelephony message is being played back.

Optionally, if more than two chronologically overlapping radiotelephony messages $SF_1$, $SF_2$ arrive at the transceiver stations $2a$, $2b$, $2c$ (FIG. 6) and possibly further transceiver stations, a plurality of radiotelephony messages may be separately buffered, the start of which, for example, is chronologically later than the start of the prioritized radiotelephony message. In this case, the buffered radiotelephony messages may be emitted in succession at the air traffic controller workplace via the loudspeaker 3, for example, in the order of their chronological start, after the end of the prioritized radiotelephony message $SF_1$.

FIG. 4 shows a second exemplary embodiment of a method according to the present invention, which corresponds to the first exemplary embodiment depicted in FIG. 3, with the following changes. As already depicted in FIG. 3, two radiotelephony messages $SF_1$, $SF_2$ arrive chronologically overlapping one another at the transceiver stations $2a$, $2b$ of an air traffic controller workplace.

In addition to the previously described approach, in the depicted exemplary embodiment, the control and processing unit 1 of the voice transmission system 100 is configured to emit a warning message WM via the loudspeaker 3 at the air traffic controller workplace before the emission of the at least one buffered radiotelephony message $SF_1$.

This warning message WM is used to make the air traffic controller aware that the subsequently emitted radiotelephony message $SF_2$ has arrived simultaneously with the previously emitted prioritized radiotelephony message $SF_1$, and was therefore buffered. As already depicted in the first exemplary embodiment, during the emission of the prioritized radiotelephony message $SF_1$, there is a visual and/or acoustic indication VAA that a plurality of radiotelephony messages is arriving chronologically overlapping. Subsequently to the end of the prioritized radiotelephony message $SF_1$, the warning message WM is emitted before the buffered radiotelephony message $SF_2$ is emitted at the air traffic controller workplace. During the emission of the warning message WM and the radiotelephony message $SF_2$, a visual indication VZ takes place at the air traffic controller workplace which indicates that it concerns a buffered radiotelephony message. This warning message is a message which is pre-recorded or automatically generated and which is understandable to humans.

Figure 5:
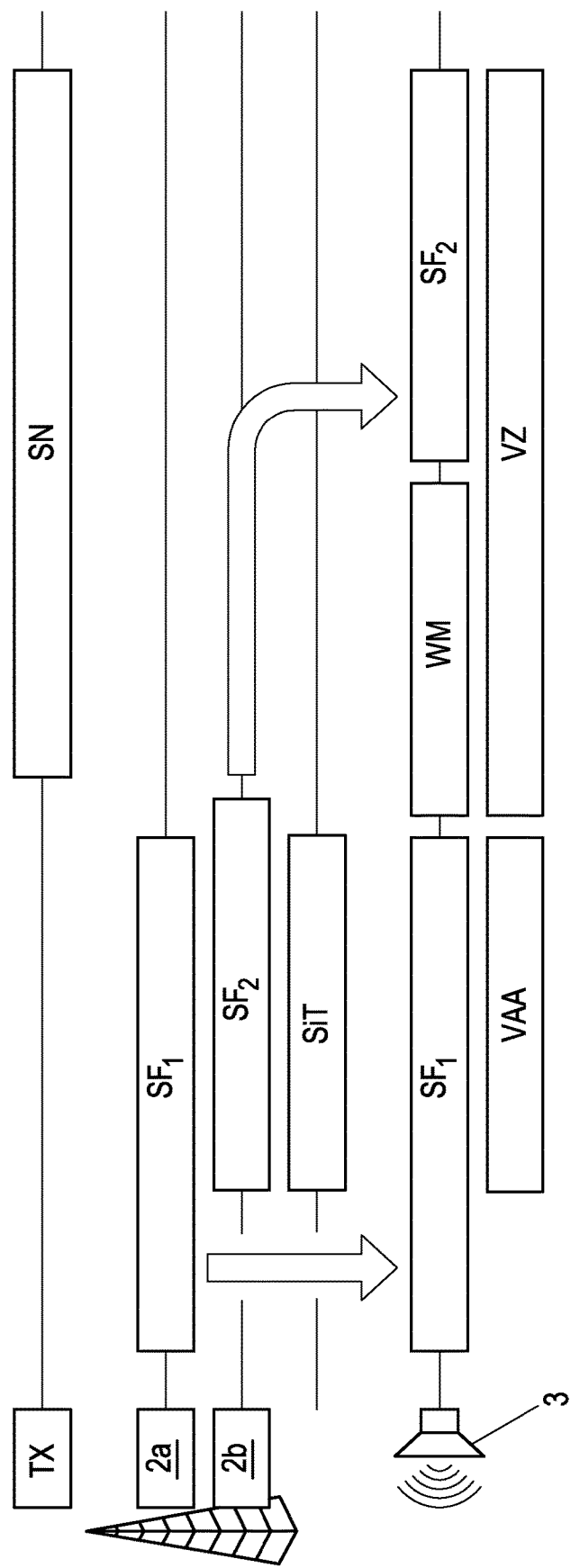
FIG. 5 is a flow chart depicting a third exemplary embodiment of a method according to the invention.

FIG. 5 depicts a third exemplary embodiment of a method according to the present invention, which corresponds to the second exemplary embodiment, except for the following changes. As already previously depicted, two radiotelephony messages $SF_1$, $SF_2$ arrive at the air traffic controller workplace chronologically overlapping. In addition to the approach depicted in the second exemplary embodiment in FIG. 4, in the third exemplary embodiment, the control and processing unit 1 of the voice transmission system 100 is configured to transmit an automatically generated voice message SN to the transmitting systems, i.e., for example, to all aircraft $F_1$, $F_2$, during the period of time after the end of the prioritized radiotelephony message $SF_1$, via the transceiver stations $2a$, $2b$, $2c$.

This automatically generated voice message SN continues at least until the at least one buffered radiotelephony message $SF_2$ is completely emitted or has been interrupted by the emission of a radiotelephony message SF by the air traffic controller. This voice message SN is used to inform the pilot that the air traffic controller is currently busy listening to the radiotelephony messages and in order to avoid further radio messages by the pilots, while the air traffic controller is listening to the buffered radiotelephony message $SF_2$, or the buffered radiotelephony message $SF_2$ is being emitted via the loudspeaker 3 at the air traffic controller workplace.

As depicted in FIG. 2, the air traffic controller workplace of a voice transmission system 100 according to the present invention contains a push-to-talk button 4 which is connected to the control and processing unit 1. When the push-to-talk button 4 is actuated, the control and processing unit 1 interrupts the emission of the buffered radiotelephony message $SF_2$ and/or the voice message SN. In this way, the air traffic controller can intervene in the emission of radiotelephony messages SF at any time, in order, for example, to respond to current situations and, for example, to give instructions.

Optionally, in the case of such a method, a time limit may also be set in order not to block the usual sequence of the radio progression at the air traffic controller workplace for longer than for a predetermined period of time, due to voice messages which are overly long. In this case, the control and processing unit 1 may, for example, be configured to interrupt the emission of buffered radiotelephony messages as soon as a time threshold value has been reached.

Figure 6:
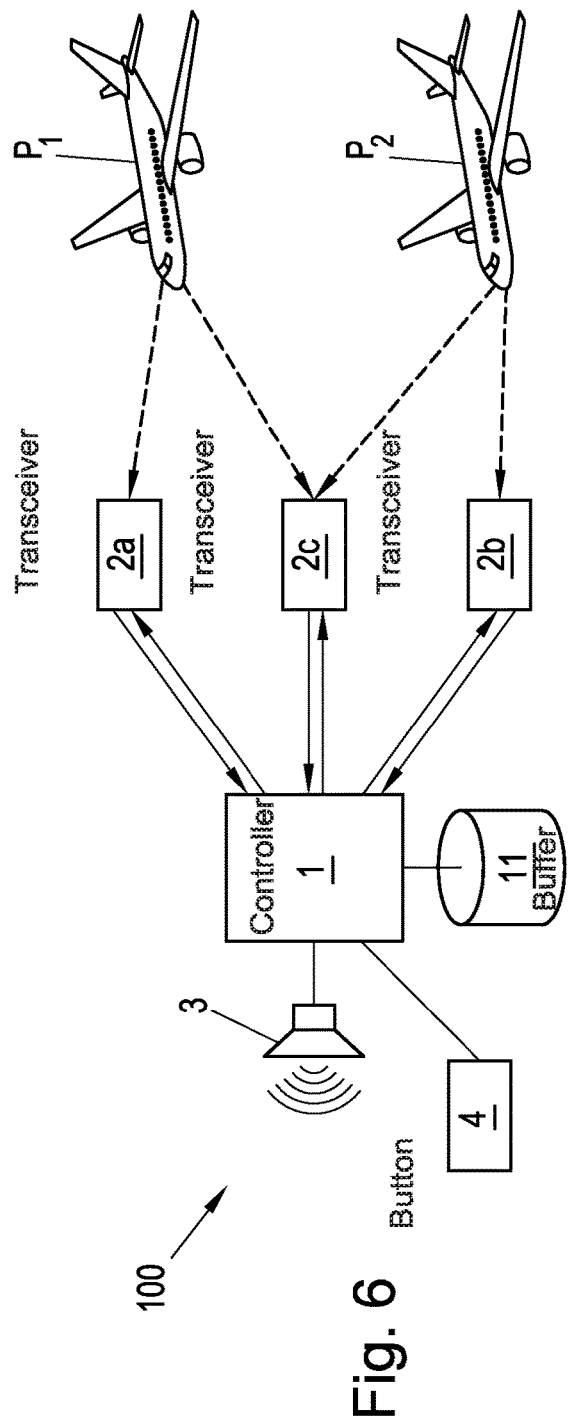
FIG. 6 is a block diagram depicting an exemplary embodiment of a voice transmission system according to the invention, in the case of simultaneous arrival of a plurality of radiotelephony messages at the same transceiver station.

As depicted in FIG. 6, if arriving radiotelephony messages SF, $SF_1$, $SF_2$ which are different from one another overlap chronologically at the individual transceiver stations 2a, 2b, 2c, the control and processing unit 1 may be designed to ascertain the transceiver station 2a, 2b, 2c in each case at which the arriving radiotelephony message SF is not overlapped or is received having the best transmission quality, for each overlapping radiotelephony message SF. Such a quality evaluation of the transmission quality and the detection of overlapped radiotelephony messages is described in greater detail, for example, in the EUROCAE ED-137/1C standard. The air traffic controller workplace of such a voice transmission system 100 according to the present invention comprises, as depicted in the exemplary embodiment in FIG. 2, a push-to-talk button 4 which is connected to the control and processing unit 1.

This is particularly advantageous, since transceiver stations 2a, 2b, 2c are usually geographically placed in such a way that the radio message of an aircraft $P_1$ or $P_2$ is received by more than one single transceiver station 2a, 2b, 2c. In the case of simultaneous radio messages from two aircraft $P_1$, $P_2$, depending on the location of the transceiver stations 2a, 2b, 2c and the position of the aircraft $P_1$, $P_2$, the transceiver stations 2a, 2b, 2c may therefore receive either only the voice message of a single aircraft $P_1$, $P_2$ or an overlap of the two voice messages. Therefore, for each arriving radiotelephony message SF, the transceiver station 2a, 2b, 2c is ascertained at which preferably only a single radiotelephony message SF is received in each case, and can thus be either conveyed prioritized to the air traffic controller workplace and emitted via the loudspeaker 3, or can be buffered in the buffer 11, without interfering echo or frequency overlaps.

The invention claimed is:

1. A method for detecting and reproducing radiotelephony messages emitted by a plurality of transmitters via radio at an air traffic controller workplace, which comprises the steps of:
analyzing whether the radiotelephony messages arriving at the air traffic controller workplace overlap one another chronologically, and if the radiotelephony messages overlap, perform the sub-steps of:
prioritizing one of the radiotelephony messages and immediately emitting a prioritized radiotelephony message to the air traffic controller workplace;
buffering at least one other of the radiotelephony messages resulting in at least one buffered radiotelephony message; and
emitting the at least one buffered radiotelephony message to the air traffic controller workplace after an end of the prioritized radiotelephony message.

2. The method according to claim 1, wherein a radiotelephony message of the radiotelephony messages starting chronologically earlier is prioritized, and the at least one other radiotelephony message respectively starting later is buffered.

3. The method according to claim 1, wherein during a period of time after the end of the prioritized radiotelephony message and/or all the radiotelephony messages arriving overlapped, an automatically generated voice message is transmitted to all the transmitters which continues at least until the at least one buffered radiotelephony message has been emitted to the air traffic controller workplace.

4. The method according to claim 1, which further comprises emitting a warning message at the air traffic controller workplace before a playback of the at least one buffered radiotelephony message, which indicates the chronologically overlapped arrival of the radiotelephony messages.

5. The method according to claim 1, wherein a playback of the buffered radiotelephony message and/or a voice message are interrupted if a push-to-talk button is actuated at the air traffic controller workplace.

6. The method according to claim 1, wherein if the radiotelephony messages which arrive at individual transceiver stations and which are different from one another, overlap one another chronologically, then:
for each individual arriving radiotelephony message, in each case, a transceiver station is ascertained at which the individual arriving radiotelephony message is received not overlapped or is received having a best quality; and
in each case, the individual arriving radiotelephony message which is received not overlapped via the transceiver station ascertained in such a way is conveyed to the air traffic controller workplace and/or is buffered in a buffer.

7. A voice transmission system, comprising:
a common air traffic controller workplace having at least one loudspeaker for emitting radiotelephony messages;
a plurality of transceiver stations each connected to said common air traffic controller workplace;
a control and processing unit connected between said transceiver stations and said air traffic controller workplace;
a buffer for storing the radiotelephony messages; and
said control and processing unit is configured to:
detect whether the radiotelephony messages which arrive via individual ones of said transceiver stations and which are different from one another overlap one another chronologically, and if a chronological overlap of the radiotelephony messages is detected,
to prioritize one of said transceiver stations, and to convey a prioritized radiotelephony message immediately to said air traffic controller workplace and to emit the prioritized radiotelephony message via said loudspeaker;
to buffer at least one radiotelephony message not conveyed to said air traffic controller workplace in said buffer; and
to emit at least one buffered radiotelephony message via said loudspeaker at said air traffic controller workplace after an end of the prioritized radiotelephony message.

8. The voice transmission system according to claim 7, wherein said control and processing unit is configured, from among chronologically overlapping radiotelephony messages, to:
prioritize a radiotelephony message of the radiotelephony messages starting chronologically earlier; and
to buffer the at least one radiotelephony message starting chronologically later in said buffer.

9. The voice transmission system according to claim 7, wherein said control and processing unit is configured to transmit an automatically generated voice message to transmitting systems via said transceiver stations during a period of time after the end of the prioritized radiotelephony messages and/or all the radiotelephony messages arriving overlapped, wherein the voice message continues at least until the at least one buffered radiotelephony message has been emitted.

10. The voice transmission system according to claim 7, wherein said control and processing unit is configured to emit a warning via said loudspeaker at said air traffic controller workplace before a playback of the at least one buffered radiotelephony message, which indicates the chronologically overlapped arrival of the radiotelephony messages.

11. The voice transmission system according to claim 9, wherein said air traffic controller workplace has a push-to-talk button which is connected to said control and processing unit, wherein said control and processing unit is configured to interrupt an emission of the buffered radiotelephony message and/or the voice message when said push-to-talk button is actuated.

12. The voice transmission system according to claim 7, wherein if the radiotelephony messages which arrive at said transceiver stations and which are different from one another, overlap one another chronologically, said control and processing unit is configured:
- for each arriving radiotelephony message, to ascertain in each case a transceiver station of said transceiver stations at which the arriving radiotelephony message is received not overlapped; and
- in each case, to convey and/or to buffer in said buffer the arriving radiotelephony message which is received not overlapped or has a best quality via said transceiver station ascertained in such a way, to said air traffic controller workplace.

\* \* \* \* \*